(12) United States Patent
Blasingame et al.

(10) Patent No.: US 10,006,258 B2
(45) Date of Patent: Jun. 26, 2018

(54) MULTI-LAYER COATING AND RELATED METHODS OF APPLICATION

(71) Applicant: SUPERIOR SHOT PEENING, INC., Houston, TX (US)

(72) Inventors: Van Blasingame, Houston, TX (US); Albert Johnson, Houston, TX (US)

(73) Assignee: Superior Shot Peening, Inc., Houston, TX (US)

( * ) Notice: Subject to any disclaimer, the term of this patent is extended or adjusted under 35 U.S.C. 154(b) by 0 days. days.

(21) Appl. No.: 15/316,070

(22) PCT Filed: Jul. 2, 2015

(86) PCT No.: PCT/US2015/039114
§ 371 (c)(1),
(2) Date: Dec. 2, 2016

(87) PCT Pub. No.: WO2016/004393
PCT Pub. Date: Jan. 7, 2016

(65) Prior Publication Data
US 2017/0096863 A1   Apr. 6, 2017

Related U.S. Application Data

(60) Provisional application No. 62/020,275, filed on Jul. 2, 2014.

(51) Int. Cl.
| | |
|---|---|
| E21B 17/10 | (2006.01) |
| C23C 4/123 | (2016.01) |
| C23C 4/129 | (2016.01) |
| C23C 4/134 | (2016.01) |
| C09D 1/00 | (2006.01) |
| C23C 4/02 | (2006.01) |

(Continued)

(52) U.S. Cl.
CPC ............ *E21B 17/1085* (2013.01); *C09D 1/00* (2013.01); *C23C 4/02* (2013.01); *C23C 4/06* (2013.01); *C23C 4/123* (2016.01); *C23C 4/129* (2016.01); *C23C 4/134* (2016.01); *C23C 4/16* (2013.01)

(58) Field of Classification Search
None
See application file for complete search history.

(56) References Cited

U.S. PATENT DOCUMENTS

| | | | |
|---|---|---|---|
| 4,601,100 A | 7/1986 | More et al. | |
| 5,224,559 A * | 7/1993 | Arnoldy | C22C 37/06 175/374 |

(Continued)

*Primary Examiner* — Caroline N Butcher
(74) *Attorney, Agent, or Firm* — Gregory L. Porter; Lloyd L. Davis; Hunton Andrews Kurth LLP

(57) ABSTRACT

A downhole tool includes a circumferential band having a plurality of axially adjacent weld beads forming a wear resistant surface along a particular axial length of the tool and at least one circumferential multi-layer coating applied axially adjacent the band on either end. The multi-layer coating includes a first layer, exhibiting a first color, applied directly onto the tool surface, and a second wear-resistant layer, exhibiting a second color different from the first color, applied directly onto the first layer. The second layer wears or is removed by a certain amount, such that the first color of the first layer is revealed to indicate the extent of wear and/or that the tool should be removed from service and refurbished by applying a new wear-resistant coating.

15 Claims, 2 Drawing Sheets

(51) Int. Cl.
*C23C 4/06* (2016.01)
*C23C 4/16* (2016.01)

(56) References Cited

U.S. PATENT DOCUMENTS

2005/0025629 A1 2/2005 Ford
2006/0102354 A1 5/2006 Gammage et al.
2010/0025255 A1 2/2010 Su et al.

\* cited by examiner

MULTI-LAYER COATING AND RELATED METHODS OF APPLICATION

BACKGROUND AND SUMMARY OF THE INVENTION

Downhole oil and gas tools are often subject to harsh, corrosive or otherwise extreme downhole environments. Accordingly, metal pre-treatments, final treatments, finishings and coatings may be applied on downhole tool surfaces as protection. In one aspect, embodiments disclosed herein relate to a downhole tools such as mandrels including a circumferential band comprising a plurality of axially adjacent weld beads forming a wear resistant surface along a particular axial length of the mandrel and at least one circumferential multi-layer coating applied axially adjacent the band on either end, the coating including a first layer, exhibiting a first color, applied directly onto the mandrel surface, and a second wear-resistant layer, exhibiting a second color different from the first color, applied directly onto the first layer, wherein when the second layer wears or is removed by a certain amount, the first color of the first layer is revealed to indicate the mandrel should be removed from service and a new wear-resistant coating reapplied.

In another embodiment a downhole tool is disclosed comprising a circumferential band comprising a plurality of axially adjacent weld beads forming a wear resistant surface along a particular axial length of the tool. The tool may have at least one circumferential multi-layer coating applied axially adjacent the band on either end. The coating comprises a first wear-resistant layer, applied directly onto the tool surface; a first color layer, exhibiting a first color, applied to said first wear-resistant layer; a second wear-resistant layer, exhibiting a second color different from the first color, applied directly onto the first color layer. When the second wear-resistant layer wears or is removed by a certain amount, the first color of the first color layer is revealed as an indication of the degree of wear.

In other aspects, embodiments disclosed herein relate to a method of applying a multi-layer coating axially adjacent at least one end of a circumferential wear band located along a particular axial length of a downhole tool, the wear band comprising a plurality of axially adjacent weld beads, the method including applying a first layer, the first layer exhibiting a first color, directly onto a surface of the downhole tool surface axially adjacent to the wear band and applying a second wear-resistant layer, the second layer exhibiting a second color different from the first color, directly onto the first layer and substantially axially adjacent to the wear band, wherein when the second layer wears or is removed by a certain amount, the first color of the first layer is revealed to indicate the downhole tool should be removed from service and a new wear-resistant coating reapplied.

DETAILED DESCRIPTION

Figure 1:
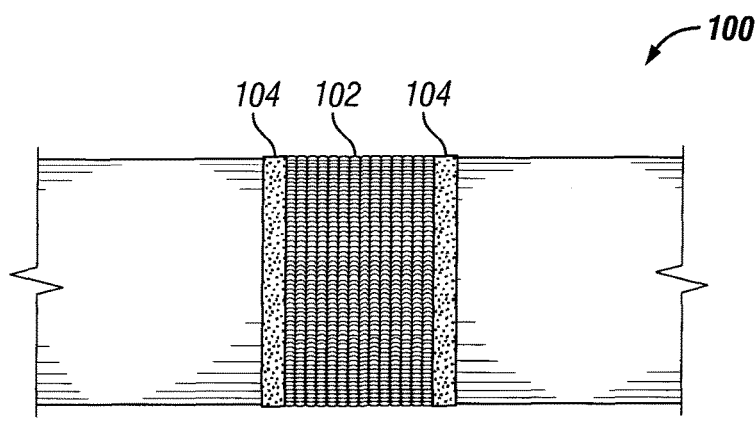
FIG. 1 illustrates one embodiment of a multi-layer coating on a downhole tool.

A multi-layer coating applied on various downhole tools, or any tools in any industry that may experience wear, and methods of applying the multi-layer coating on surfaces using, for example, thermal application methods such as spray, is disclosed. For example, downhole oil and gas drilling tool applications may include tools, e.g., mandrels, of any type, size, or diameter (e.g., imaging-while-drilling or logging-while-drilling drill collars), connector subs, and other equipment used in harsh, corrosive or otherwise extreme downhole environments. In certain embodiments, the multi-layer coating is applied on various non-cutting surfaces, that is, surfaces that are not intended for cutting rock, ground, or other materials by way of rotation or other motion of the surface, e.g., drill bit. Other applications may include all industries, including marine, aerospace, nuclear, agricultural, and military.

In one embodiment a multi-layer coating is disclosed in which a base layer is applied directly onto a metal substrate surface, such as an outer diameter of a tool surface, followed by a wear-resistant or abrasion-resistant layer applied directly onto the base layer. In another embodiment a multi-layer coating is disclosed in which a first abrasion-resistant layer is applied directly onto a metal substrate surface such as an outer diameter of a tool surface, followed by a base layer, followed by a second wear-resistant or abrasion-resistant layer applied directly onto the base layer. In another embodiment multiple circumferential multi-layer coatings are applied to the tool and each multi-layer coating may be designed to show a base layer at a different level of wear. This could provide the user a way of readily measuring depth of wear without a tool. Similarly, multiple colors or base layers could be employed within the same multi-layer coating to accomplish that.

The multi-layer coating may be applied at any location on a tool surface. The multi-layer coating may be particularly useful when applied on the tool in regions experiencing or expected to experience wear. In such cases when an outer wear-resistant layer is removed by a certain amount to reveal a base layer, that is the base layer is visible to the human eye, then a user understands the degree of wear, i.e., how much longer that the tool may remain in service or whether it should be removed from service to, for example, apply a new wear-resistant layer.

The composition and thickness of the base layer may vary depending upon the desired application and other layers. Generally, the base layer should be visually different than the wear-resistant layer(s) in some manner such that it provides an indication of wear. For example, the base layer may be of a different color than the wear-resistant layer making it easy for a user to see the color difference, and that the base layer has been revealed due to abrasion or other removal of the wear-resistant layer. Generally, coloring of the base layer may be selected from any convenient material and may vary depending upon desired application, other components, external environments, and other factors. If the base layer is to be applied directly to the metal substrate then it may be useful to select a base layer composition that has similar properties to the metal substrate. Factors sometimes considered in selecting a composition for the base layer may include, but are not limited to, adhesion, thermal expansion, electrolysis, magnetism, etc.

Like the base layer, the composition and thickness of one or more wear-resistant layers also varies depending upon the desired application and other layers. Generally, the wear-resistant layer(s) exterior to the base layer is visually different in some manner such that it provides an indication of wear. Factors sometimes considered in selecting a composition for the wear-resistant layer(s), like the base layer, may include, but are not limited to, adhesion, thermal expansion, electrolysis, magnetism, etc.

The bond strength and porosity of the layers should be such that the coating does not fail in downhole conditions to which oil and gas tools are subjected to. In one embodiment, both the base layer and the wear-resistant layer have a bond strength of greater than about 9000, or greater than about 10,000, or greater than about 11,000 psi per ASTM 633. In other embodiments, the bond strength of the base layer is less than the bond strength of the one or more wear-resistant layers. In one embodiment, the bond strength of the base layer is greater than about 5000, or of greater than about 9000 while the bond strength of the wear-resistant layer is greater than about 10,000 psi per ASTM 633. In one embodiment, the porosity of each layer of the coating is less than about 1.5, or less than about 1.25, or less than about 1, or less than about 0.9%.

Generally, when applying one base layer and one wear-resistant layer the ratio of the thicknesses of base layer to thickness of wear-resistant layer is from about 1:5 to about 5:1, or from about 1:4 to about 4:1, or from about 1:2.5 to about 2.5:1, or from about 1:2 to about 2:1, or from about 1.5:1 to about 1:1.5. In a specific embodiment, the base layer is from about 8 to about 12 thousandths of an inch. Similarly, the wear-resistant layer in a specific embodiment is from about 8 to about 12 thousandths of an inch. In another embodiment a multi-layer coating is employed in which a first wear-resistant layer applied directly onto a metal substrate surface such as an outer diameter of a tool surface is from about 3 to about 7 thousandths of an inch, followed by a base layer which is from about 2 to about 4 thousandths of an inch, followed by a second wear-resistant layer applied directly onto the base layer which is from about 3 to about 7 thousandths of an inch. In another embodiment, the total thickness of the coating regardless of number of base layers and wear-resistant layers is from about 10-15 thousandths of an inch.

Inspecting a tool having the multi-layer coating thereon may occur periodically at regular intervals, such as every trip into and out of a wellbore, every other trip into and out of the wellbore, every five trips into and out of the wellbore, or other intervals. Additionally, a tool having the multi-layer coating thereon may be inspected after a certain number of hours of service, for example, after at least about two hundred (200) hours of service, or at least about three hundred (300) hours of service, or at least about five hundred (500) hours of service, or at least about one thousand (1,000) hours of service, or at least about one thousand five hundred (1,500) hours, or at least about two thousand hours (2,000), or greater.

FIG. 1 illustrates a top view of an embodiment of a downhole tool 100 having a multi-layer coating applied at particular locations on an outer diameter of the tool 100. The downhole tool 100 may include a wear band or hard-banding 102 along a particular length of the tool. The wear band 102 may be a compilation of small adjacent weld beads forming a highly wear resistant surface. Of course, the a multi-layer coating 104 may be applied at any convenient location. As shown, a multi-layer coating 104 may be applied axially adjacent an end of the wear band 102. By axially adjacent is meant relatively near such that it may abut or have some space between.

Figure 2:
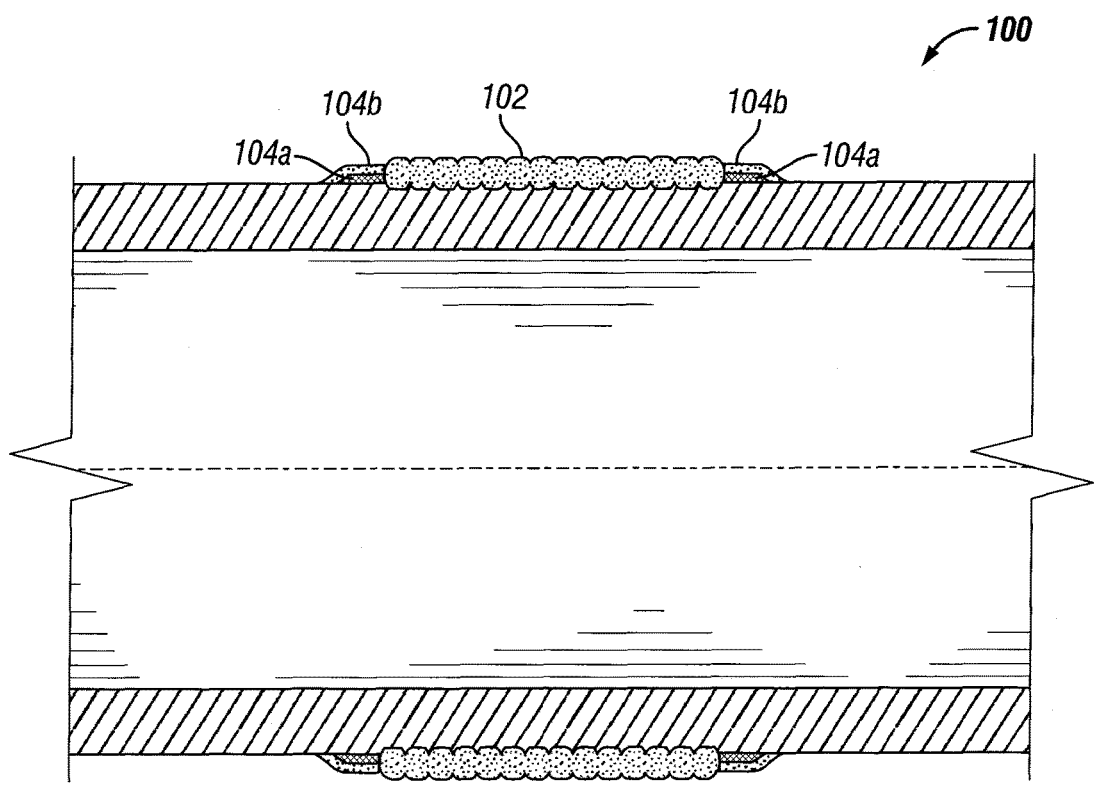
FIG. 2 illustrates a cross-section view of multi-layer coatings on a downhole tool.

FIG. 2 illustrates a cross-section view of an embodiment of the multi-layer coating 104. A base layer 104a (or first layer) may be applied directly to an outer diameter of the tool 100. The base layer 104a may be any thickness, such as at least one millimeter, at least five millimeters, at least ten millimeters, or greater. The base layer 104a may be any type of material, including but not limited to any aluminum alloy, aluminum oxide, any aluminum bronze composition, such as but not limited to those compositions ranging from about 3% to about 12% aluminum by weight, any aluminum bronze composition with other alloying agents such as iron, nickel, manganese, or silicon, chromium oxide silica, titanium dioxide ceramics, and others. Additionally, the base layer 104a may be any substantially non-magnetic material. Still further, the base layer 104 may be any material exhibiting favorable adhesion with a layer to be applied on top (e.g., the wear-resistant layer 104b described below).

A wear-resistant layer 104b (or second layer, or outer layer) may be applied directly on top of the first layer 104a. The wear-resistant layer 104b may be any thickness, such as at least five millimeters, at least ten millimeters, at least twenty millimeters, or greater. The wear-resistant layer 104b may be any type of material, including but not limited to, Inconel, stainless, molybdenum, tungsten carbide, all tungsten carbide alloys, chromium carbides, chromium oxide silica, titanium dioxide ceramics, and any other suitable material meeting one or more of the requirements of high temperature, abrasion, and corrosion resistance. Should one desire to make a downhole tool wherein the tool did not protrude at the wear band location then one could undercut the metal to about the thickness of the band before applying it.

Figure 3:
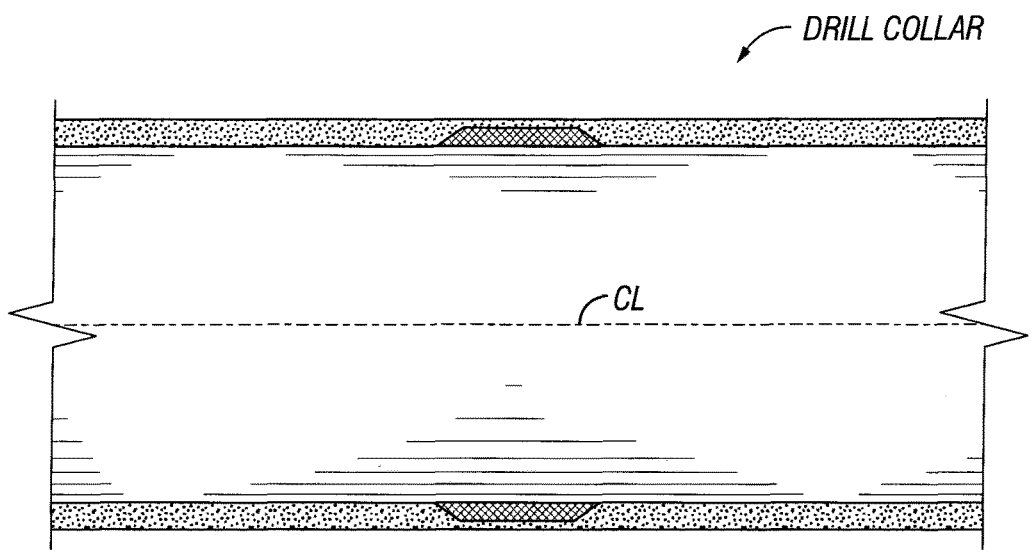
FIG. 3 illustrates an embodiment using a build coat.

FIG. 3 shows an embodiment wherein a build coat and grinding are employed to control the thickness of the base layer in a drill collar downhole tool. Specifically, the thickness is controlled by the number of spray applications and grinding of the base layer.

In alternative embodiments, a single layer of a material having variable color throughout its thickness may be applied to the outer diameter of the tool surface. That is, as the single layer wears, different colors may be visible or otherwise detectable to a user indicating whether the tool should be recoated or not. For example, the single layer may have two colors to indicate when recoating is needed (e.g., go or no-go), or the single layer may have multiple colors to indicate stages of the life of the coating.

The particular manner of forming the multi-layer coatings is not particularly important so long as the desired characteristics are obtained. Typically, the substrate is prepared to rough the surface to a suitable profile for adherence. In some cases this involves making what is known as an anchor pattern, e.g., a bond like inclusion profile of from about 2 to about 4 thousandths of an inch. In one embodiment, multi-layer coatings described herein may be applied on the metal substrate surface using thermal spraying, also called metallizing, in which metal in the form of rod, wire, or powder is melted in a stream of oxyacetylene flame, electric arc, or plasma arc, and the droplets are sprayed on the metal substrate surface at high velocities with a compressed-air spray gun.

Metal substrate surfaces may be cleaned and roughened first to improve bond strength. Thermal spraying methods may include, but are not limited to, High Velocity Oxygen Fuel ("HVOF") gas spraying, Low Velocity Oxygen Fuel ("LVOF") gas spraying, plasma spraying (high or low energy), either conventional, high energy, or vacuum, detonation gun, in which a controlled explosion takes place using an oxyfuel gas mixture, wire arc (high or low energy), in which an arc is formed between two consumable wire electrodes, flame wire spraying, in which the oxyfuel flame melts the wire and deposits it on the surface, and others.

In other embodiments, other methods of applying the multi-layer coating may also be used. For example, a coating of tungsten carbide may be mixed with a polymer or fluoropolymer in a given volume percent ratio to form a cloth-like sheet. The cloth-like sheet may then be applied over the base layer.

Advantageously, the multi-layer coating reduces or eliminates the need for mechanical or electronic measurement of dimensions by users at a worksite thereby reducing downtime and inaccuracies, and increasing productivity. In addition, original tools may be used over and over again because an indication of wear is provided before significant irreversible or other damage occurs to the metal substrate that would prevent refurbishing, providing significant cost savings to users and operators.

What is claimed is:

1. A downhole tool comprising:
a wear-resistant surface comprising a plurality of adjacent weld beads along a particular length of an outer surface of the tool; and
at least one circumferential wear-resistant multi-layer coating applied adjacent to the wear resistant surface on either end, the wear-resistant multi-layer coating comprising:
a first layer, exhibiting a first color, applied directly onto the outer surface of the tool; and
a second layer, exhibiting a second color different from the first color, applied directly onto the first layer,
wherein the wear-resistant surface and the adjacent wear-resistant multi-layer coating wear side by side such that when a certain amount of the second layer of the multi-layer coating has been removed, the first color of the first layer of the multi-layer coating is revealed as an indication of the degree of wear of the adjacent wear-resistant surface.

2. The downhole tool of claim 1, wherein the first layer comprises a thickness up to one millimeter.

3. The downhole tool of claim 1, wherein the first layer is a material selected from the group consisting of an aluminum alloy composition, an aluminum oxide composition, and an aluminum bronze composition.

4. The downhole tool of claim 3, wherein the aluminum bronze composition comprises about 3% to about 12% aluminum by weight.

5. The downhole tool of claim 3, wherein the aluminum bronze composition comprises alloying agents selected from the group consisting of iron, nickel, manganese, silicon, chromium oxide silica, and titanium dioxide ceramics.

6. The downhole tool of claim 1, wherein the first layer is a non-magnetic material.

7. The downhole tool of claim 1, wherein the second layer comprises a thickness up to five millimeters.

8. The downhole tool of claim 1, wherein the second layer is a material selected from the group consisting of Inconel, stainless, molybdenum, tungsten carbide, tungsten carbide alloys, chromium carbides, chromium oxide silica, and titanium dioxide ceramics.

9. The downhole tool of claim 1, wherein the multi-layer coating is configured to be applied to the surface of the drill collar by thermal spraying methods.

10. The downhole tool of claim 1, wherein the tool is configured as an imaging-while-drilling or logging-while-drilling drill collar.

11. The downhole tool of claim 1, wherein a thickness of the first layer is less than a thickness of the second layer.

12. The downhole tool of claim 1, wherein a thickness of the second layer is at least approximately five times a thickness of the first layer.

13. The downhole tool of claim 1, wherein the at least one circumferential multi-layer coating is applied on at least a portion of the band adjacent the end of the band.

14. The downhole tool of claim 1, wherein the tool is configured as a mandrel.

15. A downhole tool comprising:
a wear-resistant surface on a tool surface; and
a wear-resistant multi-layer coating applied adjacent to the wear-resistant surface on either end, the coating comprising:
a first layer, exhibiting a first color, applied directly onto the tool surface;
a second wear-resistant layer, exhibiting a second color different from the first color,
wherein removal of the second wear-resistant layer by a certain amount to reveal the first color provides an indication of the degree of wear of the adjacent wear-resistant surface.

* * * * *